Feb. 15, 1966    S. A. AGNEW ET AL    3,235,705
VERTICAL WELDING
Filed July 19, 1963    7 Sheets-Sheet 2

INVENTORS
STANLEY A. AGNEW
EUGENE KOCH
FRANK G. FERRAIOLI
BY John W. Gainda
THEIR ATTORNEY

Feb. 15, 1966 S. A. AGNEW ET AL 3,235,705
VERTICAL WELDING
Filed July 19, 1963 7 Sheets-Sheet 4

INVENTORS
STANLEY A. AGNEW
EUGENE KOCH
BY FRANK G. FERRAIOLI

BY John W. Gaines
THEIR ATTORNEY

Feb. 15, 1966  S. A. AGNEW ET AL  3,235,705

VERTICAL WELDING

Filed July 19, 1963  7 Sheets-Sheet 6

INVENTORS
STANLEY A. AGNEW
EUGENE KOCH
FRANK G. FERRAIOLI

BY John W. Gaines

THEIR ATTORNEY

FIG. 13A

3,235,705
VERTICAL WELDING
Stanley A. Agnew, New Providence, Eugene Koch, Maplewood, and Frank G. Ferraioli, Berkeley Heights, N.J., assignors to Air Reduction Company, Incorporated, New York, N.Y., a corporation of New York
Filed July 19, 1963, Ser. No. 296,349
23 Claims. (Cl. 219—126)

This invention relates to apparatus and process for generally vertically welding workpieces, and more particularly to means and methods for following a generally vertical seam while automatically and continuously coordinating the position of the welding electrode with two mutually perpendicular reference planes, one plane of which lies in the workpiece or workpieces.

An object of the invention is to guide the movement of vertical welding apparatus to follow a generally vertically extending seam which may deviate somewhat from exact verticality in any direction while maintaining the above mentioned coordination between the electrode location and the workpieces.

A related object is to maintain the welding electrode in a substantially fixed relationship to the seam during relative movement of the welding apparatus and the workpieces.

A related object is to maintain the welding electrode substantially centered with respect to each of two mutually perpendicular dimensions of the seam.

A more specific object is to maintain the welding electrode substantially centered between the edges of two plates to be joined, during relative movement of the welding apparatus and the workpiece.

Another specific object is to maintain the average position of the welding electrode substantially centered within the dimension of the seam corresponding to the thickness of the workpiece.

A further object is to promote ease of adjustment of the electrode to accommodate workpieces of different thicknesses.

Another object is to promote constancy of electrode position with reference to adjustment to a given thickness of the workpiece during time intervals between adjustments, while permitting ready adjustment to a different thickness of workpiece whenever desired.

A further object is to permit the use of an electric arc in a confined cavity restrictive in dimensions.

Another object is to enable the use of an arc in a narrow gap between workpieces to form and continuously maintain a molten pool of weld metal between said workpieces and damming apparatus disposed on opposite sides thereof.

Another object is to improve the extent to which an arc having the spray mode of metal transfer may be shortened without becoming unstable, to permit its use in producing a vertical weld.

A further object is to increase the arc voltage gradient, thereby making automatic control of arc length, by measurement of voltage changes, effective for this application.

A feature of the invention is the use of a trackless supporting and vertical moving means with vertical welding apparatus.

A related feature is a stabilizer for substantially preventing accidental displacement of the welding apparatus relative to a workpiece.

Another feature is a C-clamp arrangement for holding welding dams against opposite faces of a workpiece.

A further feature is the provision of a constant but adjustable normal spacing between one said welding dam and the welding electrode.

A related feature is a means for adjusting the said spacing to determine the normal location of the electrode with respect to the cooperating welding dam in order to accommodate workpieces of different thickness.

Another feature is the provision of spring-pressed wear-resisting replaceable guide members for centering an electrode holder with respect to the workpiece edges of a seam.

Another feature is a fluid-cooled contact tube holder.

A further feature is the provision of protective gas curtains associated with two opposed welding dams provided in the present welding and damming apparatus.

It will be understood that while the average position of the electrode wire is maintained fixed or centered with respect to the seam, there may be superimposed upon the electrode wire any essential or controlled motion or oscillation which it is desired to utilize in the course of a welding operation. For instance, the electrode is mechanically oscillated in certain installations along a line normal to the damming means with the result that the combined horizontally oscillated and vertically rising movement of the wire conforms to a vertical reference plane which is perpendicular to the common plane of the edges of the work plates being welded and located substantially midway between the edges of those plates.

A further feature is the use, in vertical welding, of a composition of shielding gases which causes a certain amount of constriction of the angular spread of the arc, and which enables the length of the arc to be reduced to a greater degree than heretofore found practicable without causing instability of the arc.

For example, as practiced on steel, a shielding gas mixture is used which comprises argon plus 12 to 27 percent by volume of carbon dioxide. Within this broad range of mixtures, we prefer the specific range comprising argon plus 15 to 20 percent by volume of carbon dioxide. A feature of the invention is that the use of these mixtures provides a short, stable arc, having a large voltage gradient, which has little or no tendency to arc to the workpiece edges or creep upward along the edges of the workpieces, thereby permitting a greater reduction in the practical spacing between workpieces than prior art, specifically to three-eighths of an inch as a normal operating value. Also for materials other than steel, these results are obtainable, and the gas mixture can be varied to avoid any detrimental effect on the finished weld. A large percentage of the oxidizing gas used is employed to shorten the arc while only a small percentage of it is necessary to stabilize the arc. For materials forming refractory oxides, the arc shortening may be obtained by substitution of a gas inert to the weld metal and workpieces for the oxidizing gas, with the use of a small percentage of oxidizing gas for further stability if needed.

Four to seven percent of oxygen has been added to argon to produce the desired short, stable arcs, but causes the production of an undesirable heavy, loose oxide scale on the surface of the weld.

Stability of the arc is characterized by a steady spraying transfer of metal from the tip of the consumable electrode and steady, quiet operation between the electrode and molten weld pool. First, instability is evidenced by intermittent spraying or by periods of spraying interspersed with periods of random transfer of metal, as in drops that collect at the electrode tip and fall by gravity when sufficiently large; such instability is characterized by loud crackling or sputtering of the arc. Secondly, instability is evidenced by direct arcing to the edges of the workpieces or a tendency of the arc to creep from the molten weld pool to the workpieces.

Our invention is particularly applicable to an open arc, gas shielded, bare wire consuming electrode method of vertical casting by welding, wherein two substantially vertical workpieces together with welding dams define a casting cavity, and wherein an arc from a welding current source is struck between said electrode and the rising level of molten metal and material cast in said cavity.

Other features, objects and advantages will appear from the following more detailed description of an illustrative embodiment of the invention, which will now be given in conjunction with the accompanying drawings.

In accordance with the vertical welding arrangement generally appearing in the figures of drawing, our apparatus is shown to be primarily adapted for use with a trackless suspending and elevating system therefor. In reference particularly to FIGS. 1 and 13, a hoisting means is shown comprising chains 220 attached to anchorages 221, supporting and capable of moving generally vertically a horizontal welding head beam 222 from which are supported in turn the various parts of the welding head of the present vertical welding apparatus. A clamp arm 224 is rigidly attached to and depends from the beam 222. Non-rotatably attached to the clamp arm 224 or directly to the beam 222, or both, is a horizontal cross member 226. At each end of the member 226 is non-rotatably attached one of a pair of support members 228, 228' generally vertical and diverging somewhat from clamp arm 224. Attached to or integral with each of the member 228, 228' are L-shaped members 230, 230' respectively, extending horizontally to the right from members 228, 228' as viewed in the figure and then continuing downwardly. The members 230, 230' are joined at the right by a U-shaped member 232 which is fastened at its central point to the right-hand end of the beam 222. The four members 228, 228', 230, 230' support at their bottom ends a table 234.

The clamp arm 224 carries a welding dam 20' with a shoe 24' which is shown flat against the surfaces of a pair of vertically disposed workpieces 76, 78. The welding dam has a support member 26' (FIG. 1) which is connected to the clamp arm 224 through a pivotal joint, not shown in FIGS. 1 and 13, to be described below. FIG. 2 shows in plan view the workpieces 76, 78 and shoe 24'. Opposed to the shoe 24' is the shoe 24 of another welding dam with a support member 26, pressed against the workpieces 76, 78 by a mechanism shown more particularly in FIG. 3. With both shoes against the workpiece as shown in FIG. 2, the surface of the workpiece that is pressed against the shoe 24' serves as a reference plane for left and right distances as viewed in FIG. 1. Alternatively, the surface that is pressed against the shoe 24 or in general any plane defined in the workpiece may serve as the reference plane.

Each point in any object attached to the table 234 is thus seen to have a uniquely defined position with respect to the welding apparatus which position in turn uniquely determines a distance from that point to a reference plane of a workpiece under the condition existing whenever the welding apparatus is clamped to a workpiece. This uniquely determined relationship persists even though the welding machine is removed from the workpiece and returned thereto or thereafter clamped against another workpiece.

Figures 13, 14:
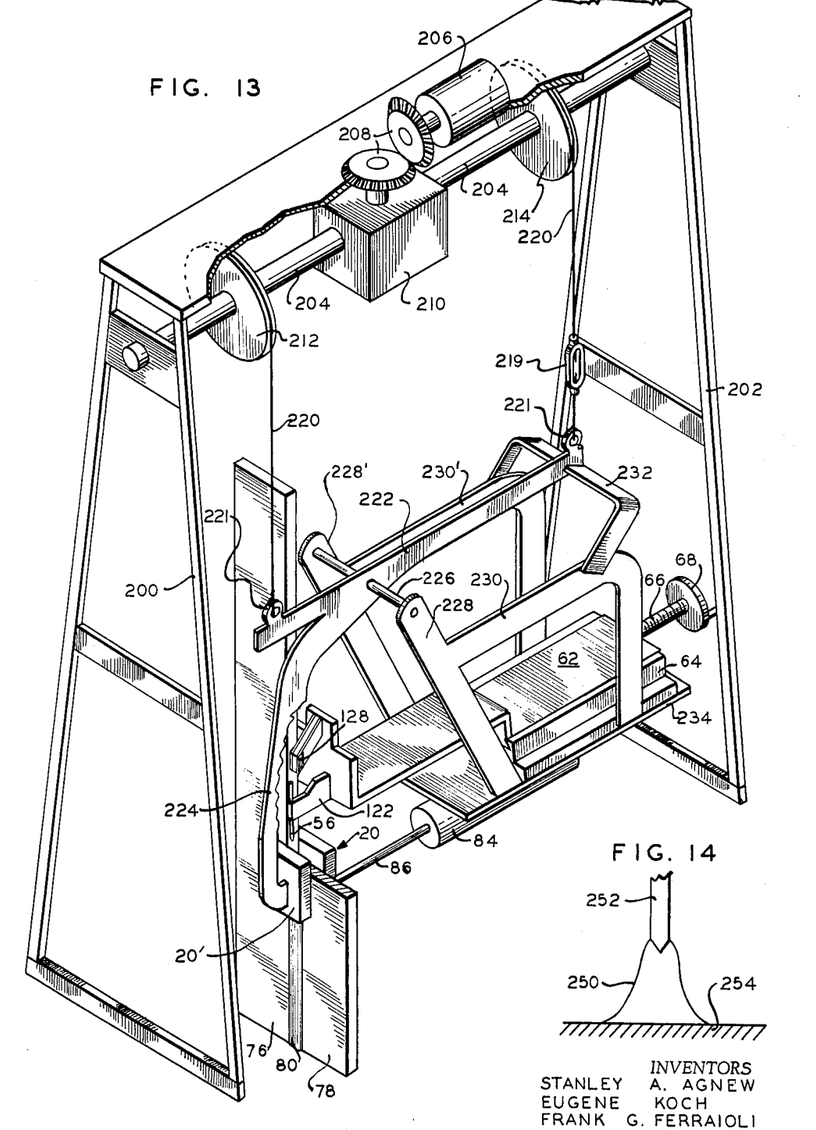
FIG. 13 is a general view, in perspective, of welding apparatus together with a trackless supporting and elevating system therefor in accordance with the invention, in which the apparatus is supported independently of the workpieces.
FIG. 14 is a diagrammatic representation of the profile of an electric arc when shielded by the particular gas mixture disclosed herein.

FIG. 13 shows standards 200, 202 supporting a horizontal shaft 204, a motor 206, bevel gears 208, and a gear box 210 containing reduction gearing connected to the shaft 204. Carried by the shaft 204 for rotation therewith, are drive wheels such as sprockets 212, 214 spaced apart along the shaft by a distance substantially equal to the distance between the anchorages 221. The chains 220 extend upwardly from the anchorages 221 and over the sprocket wheels 212, 214 in drive relation to the sprocket wheels which are driven in turn by the reduction gearing 210, the bevel gears 208 and the motor 206 to effect raising of the welding head of FIG. 1 during a welding operation and lowering the welding head to position for starting another weld.

The workpieces 76, 78 to be joined are shown, in a vertical plane between the chains; the beam 222, clamp arm 224, an electrode tip 56 and a centering mechanism 128 extending through or into the gap between the workpieces. It will be noted that the beam 222 carrying the entire welding and damming apparatus is flexibly mounted and provides the advantage of less stringent requirements on the positioning of the lifting mechanism in relation to the vertical seam. Other advantages include freedom to adapt to generally vertical seams which have irregularities in their vertical alignment without increasing the width of the gap to be filled between the workpieces. The arrangement also provides freedom to weld stationary workpieces having material curvature in the vertical plane and freedom to weld straight workpieces that are only generally vertical in positioning. The entire apparatus suspended from the chains 220 will sometimes be designated as a welding head.

Figures 1, 15:
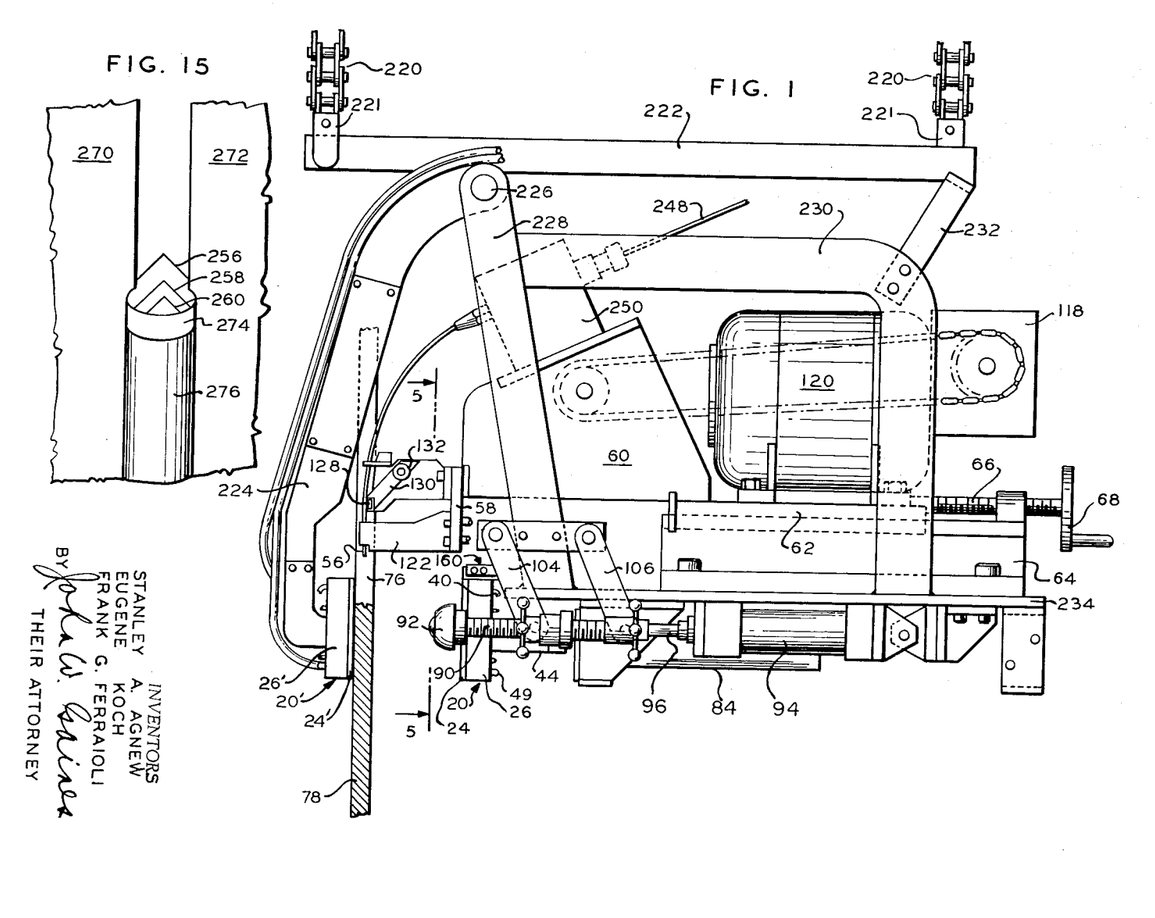
FIG. 1 is a general elevational view of a welding apparatus embodying features of the invention.
FIG. 15 is a diagram useful in explaining the method of vertical welding disclosed herein.
Figures 2, 8, 9, 10:
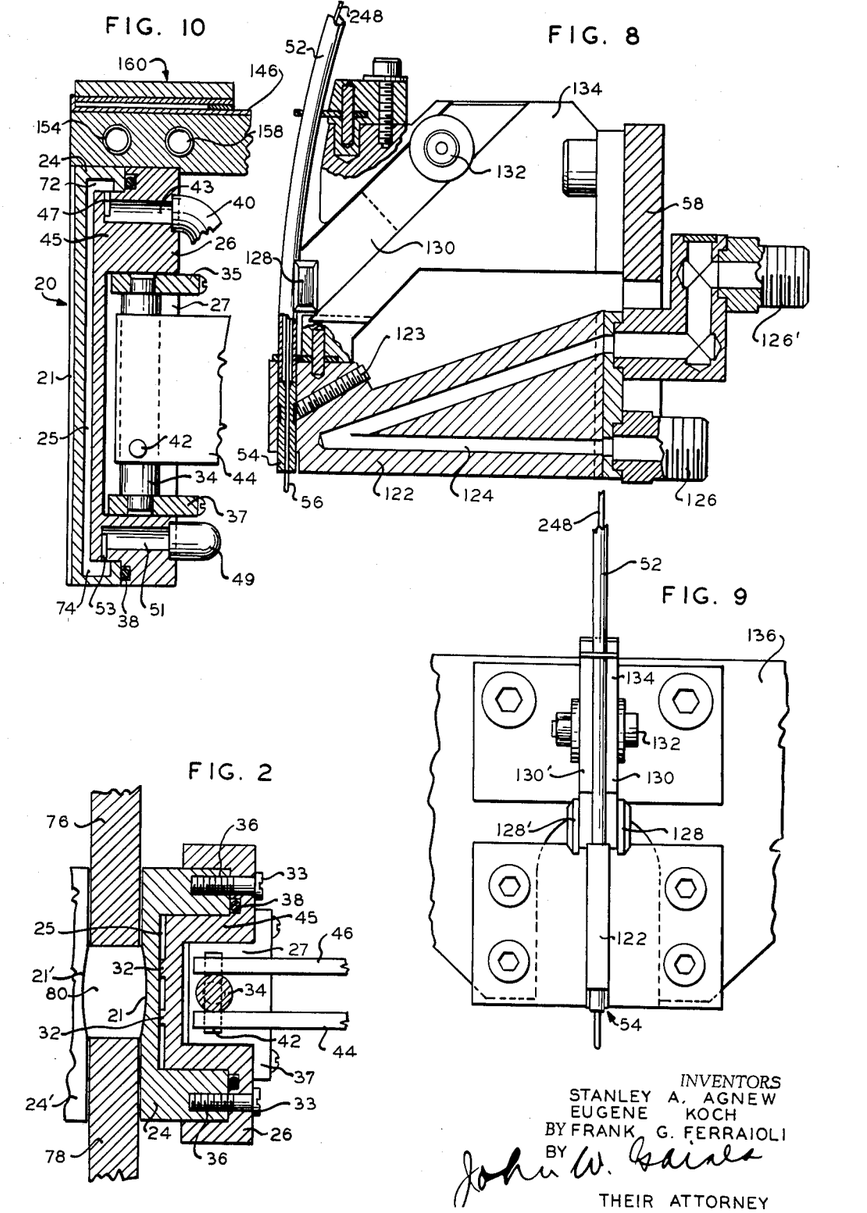
FIG. 2 is a plan of a fragment of the apparatus shown in FIG. 1.
FIG. 8 is a side elevational view, partly in cross section, of an electrode holder and centering guide assembly shown generally in FIG. 1.
FIG. 9 is a front elevational view of the apparatus shown in side elevation in FIG. 8.
FIG. 10 is a vertical cross-sectional view of a welding dam and shielding gas box, taken along the line 10—10 in FIG. 5.

Reverting to FIGURE 1, among the objects located upon the table 234 is a mechanism for guiding and advancing a consumable wire electrode. This mechanism is slidably mounted upon the table 234 so that the tip 56 of the electrode can be adjusted to any desired distance from the reference plane of the workpieces. In this way the normal location of the electrode may be centered or otherwise determined with respect to the thickness of the workpieces and its position may be adjusted to accommodate workpieces of various thicknesses. In a given case, movements or oscillations of the electrode about its normal location may be provided for as desired.

The electrode wire 248, from a storage reel (not shown) passes into a wire feed housing 250 and thence through a guide tube 52 (FIG. 8) to a contact tube 54 from which the bare end 56 of the wire protrudes to form a terminal of the welding arc. The contact tube 54 is fastened through brackets 122 and 58 to a member 60 which is attached by cantilever suspension to a slide table 62 on a slide block 64 which in turn is attached to the relatively fixed table 234. The slide table 62 and parts attached thereto are movable manually by means of a lead screw 66 and hand wheel 68. By turning the wheel 68, the contact tube 54 is adjusted in position very precisely relative to the reference plane of the workpieces. Once adjusted the electrode position as determined by the position of the contact tube 54 will remain substantially constant. The position of the electrode may be changed as needed as when changing over to a workpiece of a different thickness.

Figure 3:
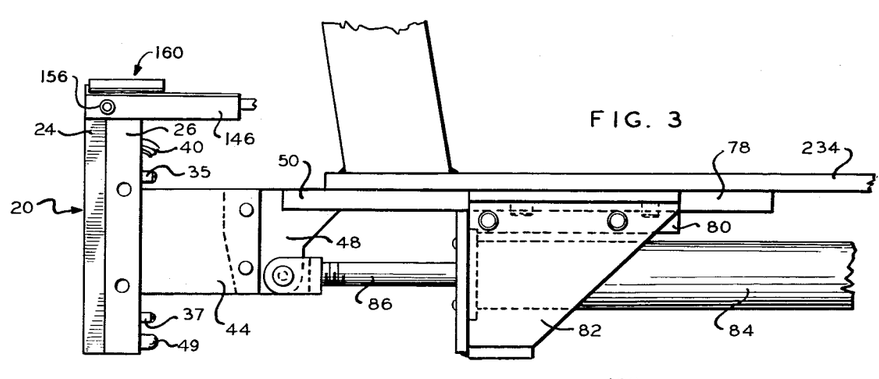
FIG. 3 is an elevational view of another portion of the apparatus shown in FIG. 1.

The shoe 24 during a welding operation is yieldingly pressed against the workpieces by means of a mechanism shown in part in FIG. 2 and more completely in FIG. 3. Referring to FIGS. 2, 3, and 10, the support member 26 for the shoe 24 of a welding dam 20 is connected through a pivotal joint with a vertical pivot 34 and a horizontal pivot 42 to a pair of connecting plates 44, 46 which are in turn fastened to a bracket 48. The bracket 48 is fastened to a slider plate 50 which is guided at its upper surface by the underside of the table 234. The slider plate 50 slides on wear-resisting steel bars 80 fastened to brackets 82 which in turn are supported from the underside of the table 234. The brackets 82 support also a pneumatic cylinder 84 having a piston rod 86 which is connected to the bracket 48 in driving relation. When the cylinder 84 is actuated, the piston rod 86 through the linkage described presses the shoe 24 against the workpieces in opposition to the shoe 24', substantially in the manner of a C-clamp.

Stabilizers 90 (FIGS. 1, 4 and 5) having ball and socket tips 92 are provided to be pressed against the workpieces one on each side of the shoe 24 to steady the apparatus and correct accidental displacement of the apparatus which is relatively freely suspended by the chains 220. A pneumatic cylinder 94 when actuated causes its piston rod 96 to move the stabilizers into contact with the workpieces. The initial position of the stabilizer 90 may be adjusted manually by means of a hand wheel 100 and locked in position by means of a hand wheel 102. Parallel motion of the stabilizer is assured by parallel links 104, 106 pivotally mounted with respect to frame member 223.

Figures 5, 6:
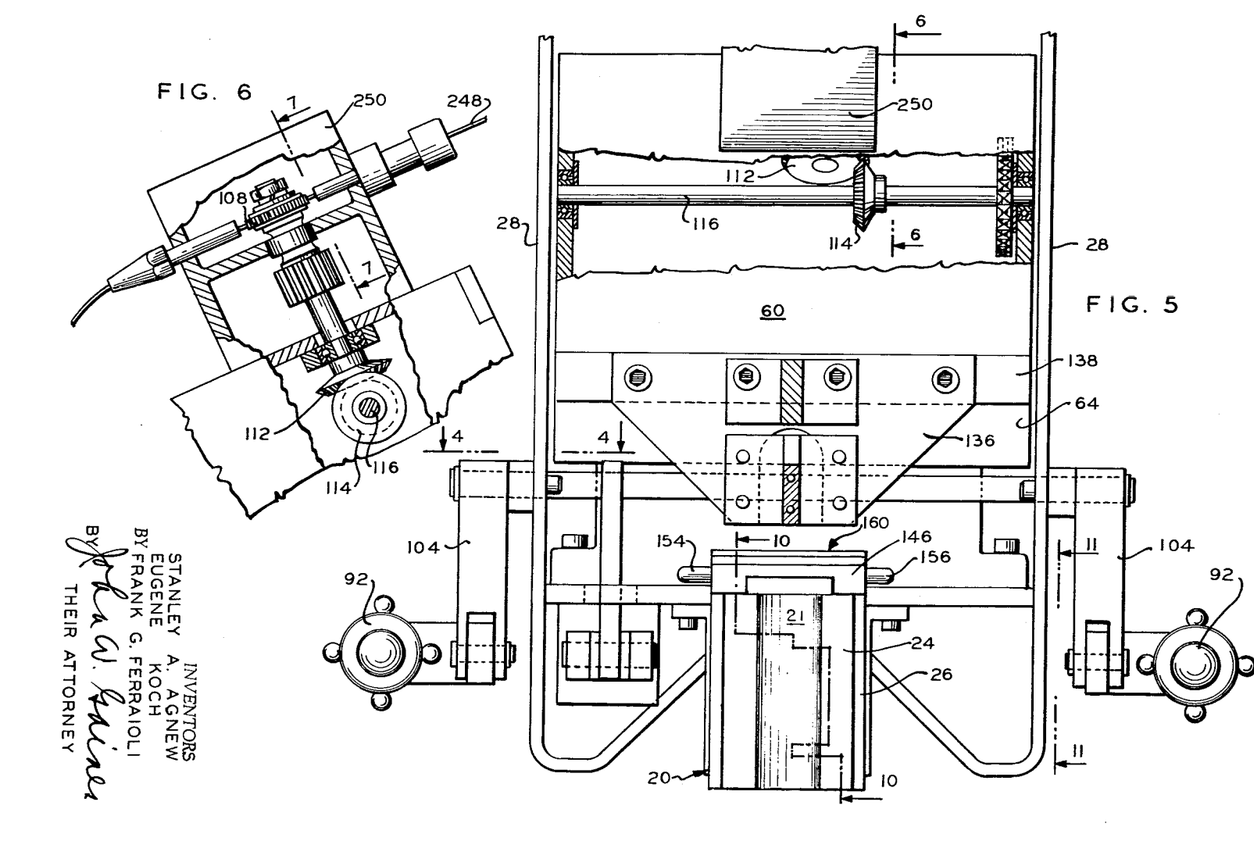
FIG. 5 is an elevational view taken from a viewpoint indicated by line 5—5 in FIG. 1.
FIG. 6 is a cross-sectional view taken along the line 6—6 in FIG. 5.
Figure 7:
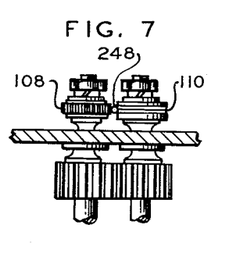
FIG. 7 is a tipped cross-sectional view taken along the line 7—7 in FIG. 6.

FIGS. 5, 6 and 7 show further details of the electrode wire feed system. FIGS. 6 and 7 show the wire 248 passing between drive wheels inside the housing 250. The drive wheel 108 is knurled to drive the wire and wheel 110 contains a V-groove to hold the wire against the wheel 108. Wheel 108 is driven by a shaft carrying a bevel gear 112. The gear 112 is driven by another bevel gear 114 on a shaft 116 which in turn is driven by a sprocket wheel and chain drive from a gear box 118 (FIG. 1) driven by a motor 120 mounted upon the slide table 62. Drive wheels 108 and 110 are geared together to promote positive wire drive.

FIGS. 8 and 9 show in detail (1) fluid cooling arrangements for the electrode holder and (2) guides for substantially centering the electrode between the sides of the seam. The contact tube 54 is secured to an electrode holder bracket 122 by means of a set screw 123. The bracket 122 contains a V-shaped fluid passage 124 which connects with fluid inlet and outlet members 126, 126'.

Illustrative electrode centering means are shown in which wear-resistive button 128 is mounted at the free end of a cantilever spring plate 130 which is anchored by a bolt 132 to a bracket 134. A similar button 128' is mounted upon a similar spring plate 130' fastened to the other side of the bracket 134. In the unstressed positions of the spring plates 130, 130' the buttons 128, 128' are symmetrically arranged with respect to the electrode tip 56. The buttons are so spaced apart as to fit snugly within the gap between the workpieces to be joined. The gap is made standard and uniform in width when the workpieces are set up, so that the buttons will be pressed against the opposed edges of the workpieces at the gap during the welding operation. The device thus serves to maintain the normal position of the electrode tip 56 centered between the edges of the workpieces within the gap while the welding is being done.

The provision of automatic centering means permits the use of a narrower gap between the workpieces to be welded than has been possible in prior vertical welding arrangements where no positive means of centering was provided. The electrode and other parts of the welding apparatus in the gap that are at welding electrode potential may be positively controlled to prevent any of them from getting so close to the workpieces at either side of the gap as to strike an arc to the workpiece at times instead of maintaining the arc upon the weld pool of molten metal where it is wanted.

As a wear-resistant material for the guide means 128, 128' we have successfully used tungsten carbide. Other similar hard, wear-resistant materials may however be used in place of tungsten carbide.

FIG. 9 shows the contact tube bracket 122 and the guide bracket 134 both mounted upon a common support member 136 which in turn is attached by way of a mounting plate 138 (FIG. 5) and the member 60 to the slide table 62, which latter is manually adjustable in position over the block 64. The adjustment is effected by the previously described hand wheel 68 so that the electrode tip 56 may be moved to any desired position relative to the thickness dimension of the workpiece, for example to a centered position.

FIG. 5 shows the welding shoe 24 in front elevation and FIG. 10 shows the shoe 24 and support member 26 in cross section to illustrate a fluid-cooling arrangement comprising a broad passage 25 formed between the shoe and the support member, sealed by means of an O ring gasket 38. Coolant inlet and outlet connections are shown at 40, 49.

Figures 4, 11:
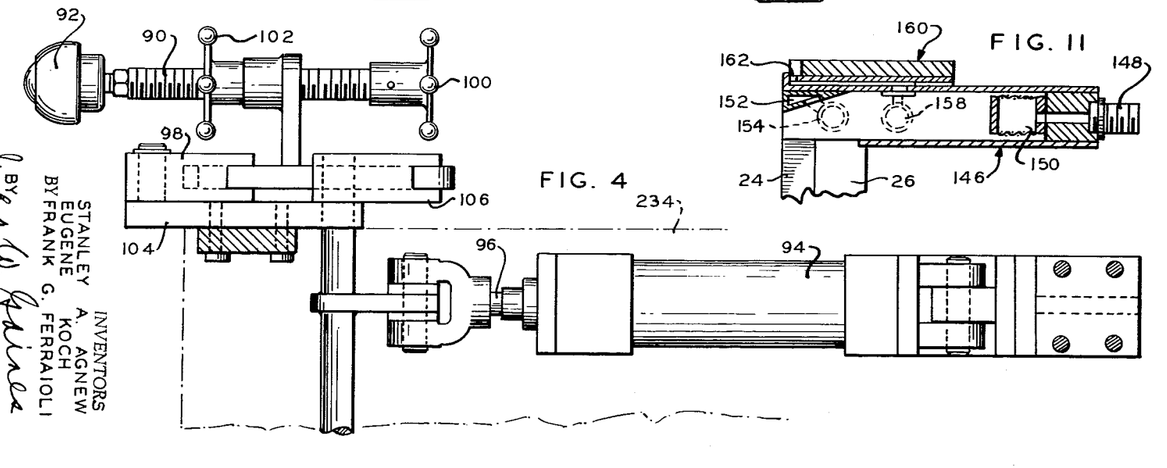
FIG. 4 is a plan view of a portion of the apparatus of FIG. 1 as seen from a viewpoint indicated by the line 4—4 in FIG. 5.
FIG. 11 is a vertical cross-sectional view of the gas box shown generally in FIG. 5 and 10.

FIGS. 5, 10 and 11 show a gas box 146 mounted on top of the welding dam 20. Shielding gas such as a mixture of argon and carbon dioxide enters the gas box through a gas inlet 148, passes through a diffusion chamber 150 with fine screens at top and bottom and is deflected downward into the region of the weld by a fluid-cooled lip 152. Coolant for the lip 152 is supplied through inlet and outlet connections 154, 156.

Compressed air or other gas to form a protective curtain for the welding region is supplied by way of a gas inlet 158 to a small chamber 160 mounted on top of the gas box 146 and issues vertically in a thin sheet at a narrow slit 162. Compressed air or other gas is likewise supplied to a chamber 186 (FIG. 12) mounted on top of the welding dam 20' to form a similar thin sheet issuing from a slit 187, substantially completing protection of the welding region by curtains of rapidly moving gas on both sides of the workpieces.

The arrangement for supporting and guiding the welding dam 20, as shown principally herein in FIG. 3, is disclosed and claimed in our copending application Serial No. 296,335 of even filing date herewith.

The internally cooled welding dam assembly shown principally herein in FIG. 10 is disclosed and claimed in a copending application of Eugene Koch and Frank G. Ferraioli, Serial No. 296,347, filed of even date herewith.

The shielding gas arrangements shown principally herein in FIG. 11 are disclosed and claimed in our copending application Serial No. 296,348, now United States Patent 3,221,134.

Figure 12:
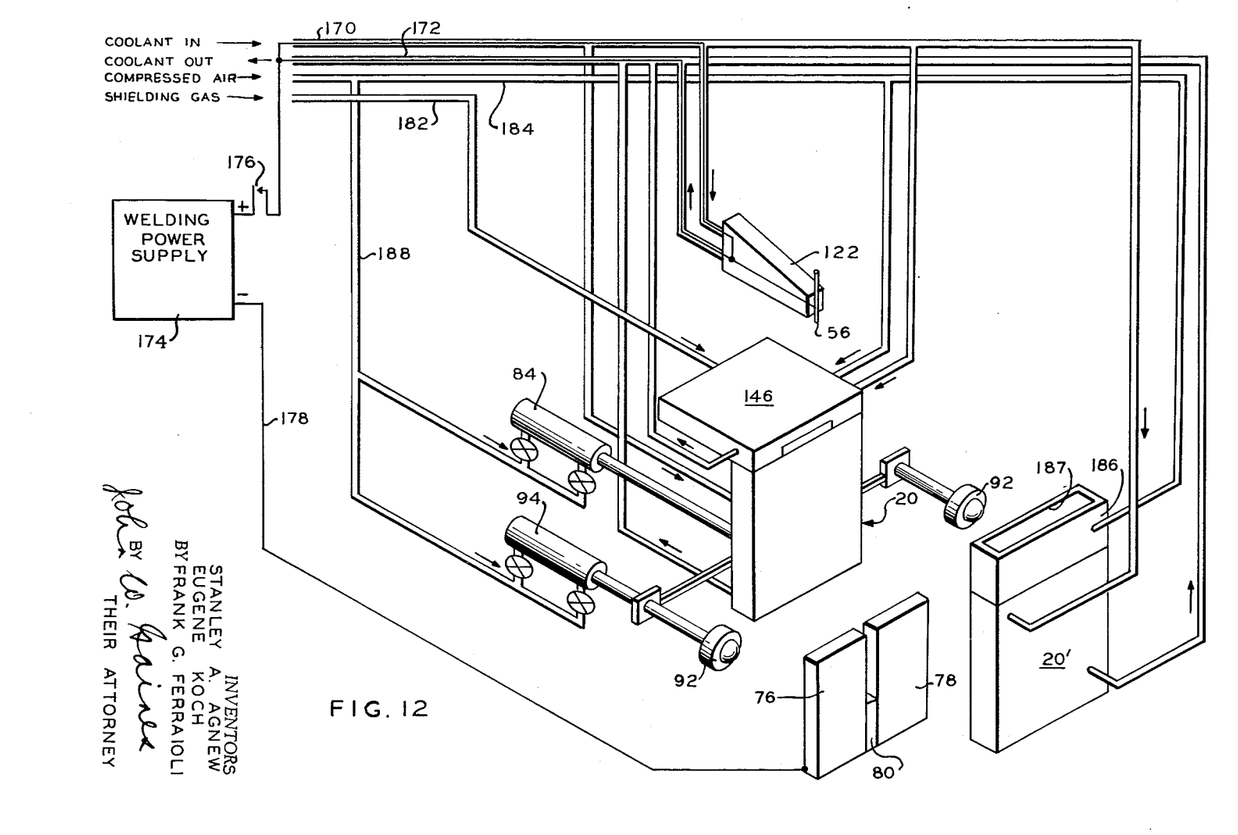
FIG. 12 is a schematic diagram and flow sheet of electric, water, and gas connections to the devices shown generally in FIG. 1.

FIG. 12 is a schematic diagram of the supply lines for welding current, water as coolant, shielding gas for the welding operation, and compressed air for the protective curtains and pneumatic cylinders. Water comes in through a combination water tube and water-cooled electric cable 170 to the fluid-cooled electrode holder bracket 122. Branch tubes without the electric cable feature distribute the incoming water to the welding dams 20 and 20' and to the gas box 146. The water returns through branch cables to another combination water tube and water-cooled electric cable 172. Arc current is supplied from the positive terminal of a welding power supply 174 through a relay-controlled welding contactor 176 into the electrical conductors of the cables 170 and 172 in parallel, to the electrode holder bracket 122 where both cables make electrical contact with the electrode wire. The return electric circuit is by way of a ground cable 178 connected between the workpieces 76, 78 and the negative terminal of the power supply 174, thus providing what is characterized as reverse polarity for the welding arc, not shown. The completed portion of the weld is shown schematically at 80 joining the workpieces 76, 78.

The shielding gas is supplied to the gas box 146 through a gas tube 182. Compressed air is supplied through a tube 184 to the curtain gas portion of gas box 146 and to a curtain gas fixture 186 mounted upon the welding dam assembly 201 to supply gas curtains on both sides of the welding region. Compressed air is also supplied through a tube 188 to pneumatic cylinder 84 for positioning the welding dam assembly 20 and to the pneumatic cylinder 94 for positioning the stabilizers 90. The cylinders 84 and 94 may be equipped with the usual valves for admitting compressed air to either side of the piston. Alternatively, one of the shielding gases may be used to activate the cylinder 84 and 94.

The supply scheme shown in FIG. 12 should be regarded as merely illustrative, as other suitable arrangements may be used instead.

Figure 13A:
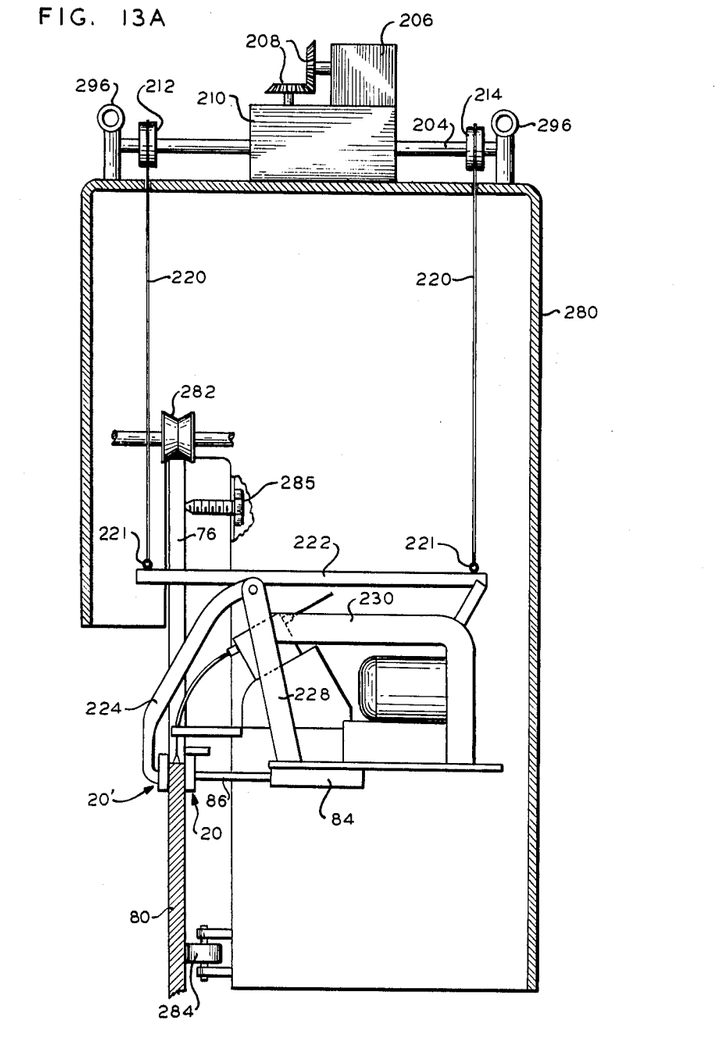
FIG. 13A is a partial elevational view of apparatus similar to that shown in FIG. 13 except that the apparatus is supported upon the workpieces.

In the operation of the arrangements shown herein, the apparatus is preferably mounted on the workpieces, if feasible, according to FIG. 13A, or the workpieces may be set up in position under the apparatus mounted independently, FIG. 13. In either case, the welding head is lowered to the level at which the weld is to start, the workpieces being located between the chains 220, close to the one of the chains 220 which is remote to the welding operator, with the beam 222, clamp arm 224, centering guides and electrode contact tube extending into or through the gap which is to be filled in by the weld. The head may be leveled by known means such as a turnbuckle 219 (FIG. 13). The normal position of the contact tube for the welding electrode is adjusted by means of the hand wheel 68, the stabilizers 90 are adjusted and the cylinders 84 and 94 are actuated. Then, as the welding proceeds, the welding head is raised at a suitable rate to accommodate the proper formation and solidification of the weld. As the head is raised, the welding dams are yieldingly held in place by the pressure from the piston rod 86, as above described, said dams being free to rotate about the end of piston rod 86 in such a way that the piston rod is substantially at right angles to the workpieces at all times, thus permitting the shoes to adapt to irregularities in the workpieces and misalignments of the workpieces. The yielding pressure upon the shoes maintains the electrode in its desired position substantially at all times in coordinated relation in the direction of the thickness to a reference plane in the workpieces. The guide members 128 at the same time maintain the normal position of the electrode substantially at all times in coordinated relation to the workpiece edges of the gap which is being filled by the weld. The stabilizers guard the apparatus against accidental displacement during the welding operation. The hot working parts are fluid cooled and the region of the weld may be shielded from wind and drafts by means of the gas curtains described herein. Between welds, the motor 206 may be reversed in direction of rotation to lower the welding head as to a new starting position.

Referring more particularly to FIG. 13A, a scaffold or casing 280 is shown which may surround and be attached to a rigid scaffold frame, such as a structure composed of angle iron members. For clarity in the drawing, the frame is not shown. Attached to the frame is a suitable shaft supporting a roller 282 which is arranged to rest upon the upper edge of the workpiece 76, and by which the frame, casing and welding head may be moved along the workpiece 76, from one vertical seam location to another. In general, two or more rollers 282 may be used as needed. Attached to the casing or frame of the scaffold, near the bottom is a roller 284 which bears upon a surface of the workpiece enabling a major portion of the scaffold to cantilever in a generally overhanging relation to the welding operator's side of the workpiece. Two or more rollers 284 may be used as needed. When the device is in position at a seam location, the frame and casing may be clamped in place by suitable means such as a locking screw 285. In other respects, the arrangement of FIG. 13A is similar to that shown in FIG. 13 and requires no further description. To aid in rolling the device from one seam location to another, lift pad eyelets 296 may be provided. The shaft 204, motor 206, bevel gears 208, gear box 210, and sprocket wheels 212, 214 may be mounted upon the top surface of the casing 280 or upon the frame. Space is provided above the level of the roller 282 so that the welding head may be lifted as required to complete the seam to the top edge of the workpiece 76. In work such as the fabrication of a cylindrical tank, a tier of plates may be joined, rolling the machine along the top of the tier between welds, and when the tier is finished, the next tier of plates may be set up and the machine lifted into place thereon.

Examples of common, weldable mild steel plate suitable for utilizing this invention in fabricating storage and other tanks are the following: ASTM–A7; ASTM–A283 Grades C and D; ASTM–A131 Grades A, B and C; ASTM–A201 Grades A and B; ASTM–A284 Grade B; and ASTM–A373 plate.

To enable welding to be satisfactorily accomplished in a narrow gap, we not only employ the guide members 128, 128' to continually center the electrode within the gap to prevent undesired arcing to the workpiece edges of the gap, but we also employ a mixture of shielding gases within a range of composition which we have found to be effective to permit a reduction in arc length without instability to the extent that the arc can be maintained so as to form a continuous molten weld pool in the narrow gap between said workpieces.

The principle involved is an interdependent relation between gap width and arc length, the gap width being the independent variable in this case. First, the gap width is made as narrow as possible, by design of those mechanical parts which must be in the gap together with a guidance system, to obtain a greater length of weld per pound of filter metal. Then, the arc is made shorter to enable it to operate within the gap yet not so short that the heating produced will fail to provide the degree of fusion necessary to produce the weld desired.

The preferred process by which the wire is deposited is the inert gas shielded consumable electrode process employing reverse polarity and inert shielding gases as disclosed in Muller et al. U.S. Patent No. 2,504,868, granted April 18, 1950, and owned by the assignee hereof.

The metals to which the present vertical welding process applies include various steels, aluminum, and aluminum alloys. The welding wire selected will depend in its chemical formulation upon the composition of the weld-piece material so as to be compatible in properties therewith.

For welding mild steel workpieces, for example, two wires commercially available from Air Reduction Company, Incorporated, and one wire commercially available from American Chain and Cable Company (Page) have been found satisfactory and have respective chemical weight percent analyses as follows:

| Wire Designation | C | Mn | Si | Mo | P |
|---|---|---|---|---|---|
| Airco A-675 | 0.10 | 1.10 | 0.50 | | 0.02 |
| Airco A-632 | [1] 0.10 | 1.25 | 0.50 | 0.50 | [1] 0.03 |
| Page AS-18 | 0.10 | 2.15 | 0.66 | 0.50 | |

| Wire Designation | S | V | Cr | Ni | Balance Fe |
|---|---|---|---|---|---|
| Airco A-675 | 0.02 | | | | |
| Airco A-632 | [1] 0.03 | 0.15 | [1] 0.15 | 1.45 | |
| Page AS-18 | | | | | |

[1] Maximum.

For these purposes when welding steel, we have found a mixture comprising substantially pure argon plus 12 to 27 percent by volume of carbon dioxide to be effective and satisfactory. Within this range, 15 to 20 percent by volume of carbon dioxide has been found most satisfactory.

We have found furthermore that these mixtures increase the voltage gradient in the arc, a result which is particularly important in automatic control of the arc length, because a sensing device actuated by changes in arc voltage to adjust the spacing between the electrode and the weld pool becomes more effective the greater the voltage gradient.

Due to the shorter arc length which may be attained without arc instability, together with the greater precision in maintaining a close electrode spacing, vertical welding is practicable with our appartaus in a gap as narrow as one-half of an inch, and satisfactorily subject to precise automatic control. While the absolute minimum gap usable has not been determined, welding has been accomplished in a gap having three-eighths of an inch as its minimum dimension.

We attain significantly high rates of metal deposition with the present invention, with the preferred rates being in the range between approximately 12 and 35 pounds of wire consumed per hour, depending upon the wire size. Within the preferred range of wire consumption, a preferred sub-range for 5/64" ferrous wire for example, is between approximately 20 and 25 pounds of wire consumed per hour.

FIG. 14 shows a typical arc shape observed when welding on a flat plate using a consumable electrode with shielding gas having a composition within the above specfied range. The arc profile 250 is shown between an electrode 252 and a surface 254. FIG. 15 shows the effect of shortening the arc length when using the arc in a narrow gap, as between two vertical plates 270, 272 to be joined. Angular lines 256, 258 and 260 diagrammatically represent the outlines of arcs having various arc lengths. The arc length corresponding to the arc 256 is so great that the arc does not provide sufficient heat to the weld pool area to insure complete fusion. The shorter arc 258 is an improvement, but the arc 260 illustrates the desired length. The molten weld pool is shown at 274 and the solidified weld at 276. It will be understood that FIG. 15 is approximate.

It may be noted that, while the use of the particular mixture of shielding gas disclosed herein causes some shrinking of the outer mantle of the arc, the principal gain comes from the fact that, although the angle of spread of the arc remains substantially constant as the arc length is shortened, the use of the disclosed gaseous mixture enables the arc length to be shortened without causing instability and thus allows welding in a narrow gap without the arc becoming unstable. The combination of the short arc together with the use of automatic centering of the electrode in turn makes possible the further narrowing of the gap between the workpieces to an extent not known in the prior art. The example used is related to the welding of steel, but the principles are the same for application of this welding method to aluminum and other materials regardless of the material being welded.

While illustrative forms of apparatus and methods in accordance with the invention have been described and shown herein, it will be understood that numerous changes may be made without departing from the general principles and scope of the invention.

We claim:

1. In vertical welding apparatus, in combination, a welding head, a trackless suspension device for suspending and raising said welding head, means for yieldably clamping said welding head to a workpiece for parallel generally vertical motion of said welding head relative to a reference plane determined by a surface of the workpiece, a framework included in said welding head, a welding electrode, guide means disposed with respect to said welding electrode means mounted upon said framework for advancing said welding electrode and said guide means into a gap between parts of a workpiece to be joined by welding, with said guide means adjacent to the workpiece on each side of said gap and the electrode in welding position within the gap, and spring-actuated means for pressing said guide means against the respective edges of the workpiece at the gap while said welding head is raised during a vertical welding operation, whereby the welding electrode is maintained within said gap with the normal position of the welding electrode in a fixed relationship to the edges of the workpiece at the gap during said welding operation, thereby permitting the use of a narrow gap without material danger of shorting electrically any portion of the apparatus at welding electrode potential to any portion of the workpieces.

2. In vertical welding apparatus, in combination, a trackless suspension and moving device for said apparatus for moving said welding apparatus generally vertically in a welding operation, means for yieldably clamping said welding apparatus to a workpiece for parallel generally vertical motion relative to a reference plane determined by a surface of the workpiece, a guide member for a welding electrode carried by said welding apparatus, means for holding said guide member and said electrode within a gap between parts of the workpiece to be joined and in operative relation to the workpiece, said means maintaining the normal position of said electrode at a fixed distance from said reference plane, and centering guide means yieldingly attached on each side of said electrode guide member, said centering means being spring-pressed against the workpiece on each side of said gap, whereby said electrode is maintained centered with respect to the width of the gap and at the same time is maintained at a substantially fixed average distance from said reference plane.

3. In vertical welding apparatus for welding open seams between adjacent edges of generally horizontally spaced apart workpieces: the combination of a trackless welding head comprising welding and damming means; flexible suspended lift chains disposed one at each side of the workpieces for upwardly and downwardly moving said head; said head disposed with parts extending between the workpieces and presenting a portion at each of the opposite sides of the workpieces and each connected to the lift chain at that side; and guiding means engaging at least one of the adjacent edges of the workpieces to guide the head in the vertical direction in one of two mutually perpendicular planes of the seam, said damming means guiding the head in the vertical direction in the other of the mutually perpendicular planes.

4. In vertical, gas shielded, arc welding apparatus for welding open seams between adjacent edges of spaced apart workpieces: the combination of a trackless welding head comprises welding and damming means; lifting mechanism supported on the top of said workpieces; said mechanism comprising depending flexible lift chains disposed one on each side of the workpieces for upwardly and downwardly moving said head; said head disposed with parts extending between the workpieces and presenting a portion at each of the opposite sides of the workpieces connected to the lift chain at that side; and guiding means engaging at least one edge of the workpieces to guide the head in the vertical direction in one of two mutually perpendicular planes of the seam, said damming means guiding the head in the vertical direction in the other of the mutually perpendicular planes.

5. Vertical welding apparatus for arc welding open seams between adjacent edges of spaced apart workpieces including: the combination of a trackless welding head comprising welding and damming means; a head-supporting scaffold carrying rollers for rolling in the general horizontal plane of the tops of the workpieces to a point substantially vertically aligned with an open seam to be welded; lifting mechanism supported solely on said scaffold, said mechanism comprising flexible depending lift chains disposed one at each side of the workpieces for upwardly and downwardly moving said head; said head disposed with parts thereof within said seam so as to extend between the workpieces and presenting a portion at each of the opposite sides of the workpieces connected to the lift chain at that side; and guiding means engaging at least one edge of the workpieces to guide the head in a vertical direction maintaining it substantially centered with respect to the width of the seam being welded.

6. Apparatus described according to claim 5, wherein said scaffold is cantilevered by said rollers so that a major portion of the apparatus is in overhanging relation to one side of the workpieces, said chains arranged with the chain at said one side of the workpieces being relatively remote to that side and the chain at the other side being relatively close to that side so that at least a major portion of the head is suspended in offset relation with respect to the aforesaid one side of the workpieces, affording generally overall accessibility to a welding operator located at that side of the workpieces.

7. Apparatus described according to claim 5, wherein said scaffold has locking means engageable with the workpieces to prevent shift of said scaffold with respect to a seam during welding.

8. A method of upward vertical electric arc welding steel with a bare solid wire consumable electrode connected to a source of welding current wherein an arc is maintained between said electrode and a weld pool in a relatively narrow gap between the vertically oriented spaced edges of two workpieces connected to said source, characterized by feeding a mixture of substantially pure argon plus 12 to 27 percent of carbon dioxide by volume to shield the arc, and restricting the arc length to such an extent that in the presence of the said shielding gas mixture the spread of the arc at the surface of the weld pool is such as to enable forming and maintaining a molten weld pool in the narrow gap between said workpieces.

9. A method of upward vertical electric arc welding steel with a consumable electrode in a narrow gap between the vertically oriented spaced edges of two workpieces, characterized by feeding a mixture of substantially pure argon plus 15 to 27 percent by volume of carbon dioxide to shield the arc, maintaining the electrode in the said gap so that its average position is mechanically centered during the welding operation, and using an arc length which in the presence of the said shielding gas is substantially as short as may be without causing instability of the arc, whereby the width of said gap that may be employed without material danger of the arc striking to the workpiece edges of the gap may be reduced materially compared to the minimum width of said gap which can be used without mechanical centering of the electrode and with conventional shielding gas mixtures for spray type metal transfer across the arc.

10. In the method of joining plates by electric arc welding wherein an arc is maintained between a consumable metal electrode and a pool of deposited weld metal at the bottom of a cavity bounded by the vertically oriented spaced edges of the plates to be joined and oppositely disposed movable weld dams spanning the space between adjacent plate edges, the improvement which comprises (a) maintaining the edges of the plates spaced by a distance not less than ⅜ inch,
(b) centering the electrode end within such space,
(c) shielding the arc from the atmosphere by continuously introducing into the cavity a mixture of gases comprising essentially commercially pure argon,
(d) feeding the electrode toward the arc at a rate of at least 100 inches per minute,
(e) supplying welding current to the electrode and the pool of deposited weld metal at a strength sufficient to both consume the electrode at said rate and also project molten metal axially from the wire electrode to the workpiece in the form of a spray of fine discrete droplets,
(f) forming said gas mixture by admixing with said argon a sufficient quantity of a gas metallurgically compatible with the weld metal and of higher ionization potential than argon to contract the cross section of the arc plasma and permit a reduction in arc length without causing instability of the arc and
(g) raising the arc end of the electrode and the weld dams at a rate equal to the rate of rise of the weld pool as a result of the deposition of weld metal therein from the welding electrode.

11. The method of joining plates by electric arc welding in accordance with claim 10 in which the said gas mixture consists of from 12% to 27% by volume carbon dioxide and the balance argon.

12. The method of joining plates by electric arc welding in accordance with claim 10 in which the rate at which the arc of the electrode and the weld dams rise is automatically controlled by a sensing device actuated by changes in arc voltage.

13. In apparatus for welding an open seam in a gap which extends in a generally vertical direction between confronting edges of workpiece parts, the combination of a trackless welding head, said welding head comprising a portion adapted to extend through said gap and portions which in the working position of the welding head are located some on one side and some on the other side of said workpiece parts, and flexible overhead suspending and elevating means attached to said welding head at first and second points, one said point lying in a portion of said welding head located on one side of said workpiece parts and the other said point lying in a portion of said welding head located on the other side of said workpiece parts when said welding head is in the welding position.

14. Apparatus according to claim 13, in which one said point is located several times closer to said workpiece parts than the other said point.

15. In vertical welding apparatus for welding open seams between adjacent generally vertical edges of workpieces: the combination of a trackless welding head, and flexible lift lines disposed one at each side of the workpieces for moving said head; said head when in working position being disposed with a portion extending through the open seam and having portions on each of the opposite sides of the workpieces, said lift lines being connected to said welding head on opposite sides of the workpieces.

16. Apparatus according to claim 15 together with lifting mechanism supported on the top of said workpieces, the said lift lines being dependent from said lift mechanism.

17. In vertical welding apparatus, in combination, a trackless suspension and moving device for moving said apparatus generally vertically in a welding operation, a welding electrode, a pair of centering means, means for supporting said electrode and said centering means in such relative positions that the electrode is maintained in a plane which passes centrally between said centering means, and means for positioning said electrode and said centering means within a vertical gap between workpiece parts to be joined, said centering means each being in contact with the workpiece part on a respective side of said gap, and said centering means being yieldingly pressed against the respective sides of said gap, whereby said electrode is maintained centered with respect to the width of the said gap.

18. In vertical welding apparatus, in combination, a trackless suspension and moving device for said apparatus for moving said welding apparatus generally vertically in a welding operation, a welding electrode, and a pair of electrode guiding means, carried by said welding apparatus, and means for relatively positioning said guiding means and said electrode within a gap between parts of the workpiece to be joined and in operative relation to the workpiece with said electrode centered between said guiding means, said guiding means being yieldingly pressed against the workpiece on each side of said gap, whereby said electrode is maintained centered with respect to the width of the gap.

19. Apparatus according to claim 18, in which said electrode guiding means comprise bearing members composed of hard, wear-resistant material.

20. Apparatus according to claim 19, in which said hard, wear-resistant material is tungsten carbide.

21. Apparatus according to claim 19, in which said electrode guiding means have a dimension of 9/16 to 3/8 inch in the direction of relative motion of the electrode guiding means and the workpiece.

22. Apparatus according to claim 19, in which said electrode guiding means comprises a member made of tungsten carbide having a dimension of 9/16 to 3/8 inch in the direction of relative motion of the guiding means and the workpiece.

23. Vertical welding apparatus for arc welding open seams between adjacent edges of spaced apart workpieces including: the combination of a trackless welding head, a head-supporting scaffold including rollers for rolling the scaffold upon the workpieces in the general horizontal plane of the tops of the workpieces to a point substantially vertically aligned with an open seam to be welded, and lifting mechanism supported solely on said scaffold, said lifting mechanism comprising flexible depending lift lines disposed one at each side of the workpieces for moving said head; said head being disposed with parts thereof within said seam so as to extend between the workpieces and said head having other portions respectively at each of the opposite sides of the workpieces, each said last mentioned portion being connected to the respective lift line on the same side of the workpieces.

References Cited by the Examiner

UNITED STATES PATENTS

| | | | |
|---|---|---|---|
| 1,867,979 | 7/1932 | Mayoh | 219—126 |
| 2,189,399 | 2/1940 | Lewbers | 219—124 |
| 2,932,721 | 4/1960 | Kooistra | 219—74 |
| 2,947,847 | 8/1960 | Craig et al. | 219—74 |
| 2,969,454 | 1/1961 | Lucey | 219—126 |
| 2,997,571 | 8/1961 | Smout | 219—126 |
| 3,024,352 | 3/1962 | Danhier | 219—126 |
| 3,040,166 | 6/1962 | Krieweth et al. | 219—126 |
| 3,046,386 | 7/1962 | Wooding et al. | 219—126 |

FOREIGN PATENTS 1,254,428  1/1961  France.

RICHARD M. WOOD, *Primary Examiner.*

UNITED STATES PATENT OFFICE
CERTIFICATE OF CORRECTION

Patent No. 3,235,705                       February 15, 1966

Stanley A. Agnew et al.

It is hereby certified that error appears in the above numbered patent requiring correction and that the said Letters Patent should read as corrected below.

Column 4, line 41, strike out "of", first occurrence; column 10, line 18, after "electrode" insert a comma; line 72, for "comprises" read -- comprising --.

Signed and sealed this 20th day of June 1967.

(SEAL)
Attest:

ERNEST W. SWIDER
Attesting Officer

EDWARD J. BRENNER
Commissioner of Patents